(No Model.)
H. SKILLINGS.
SPADE WHEEL PLOW.
No. 307,809. Patented Nov. 11, 1884.
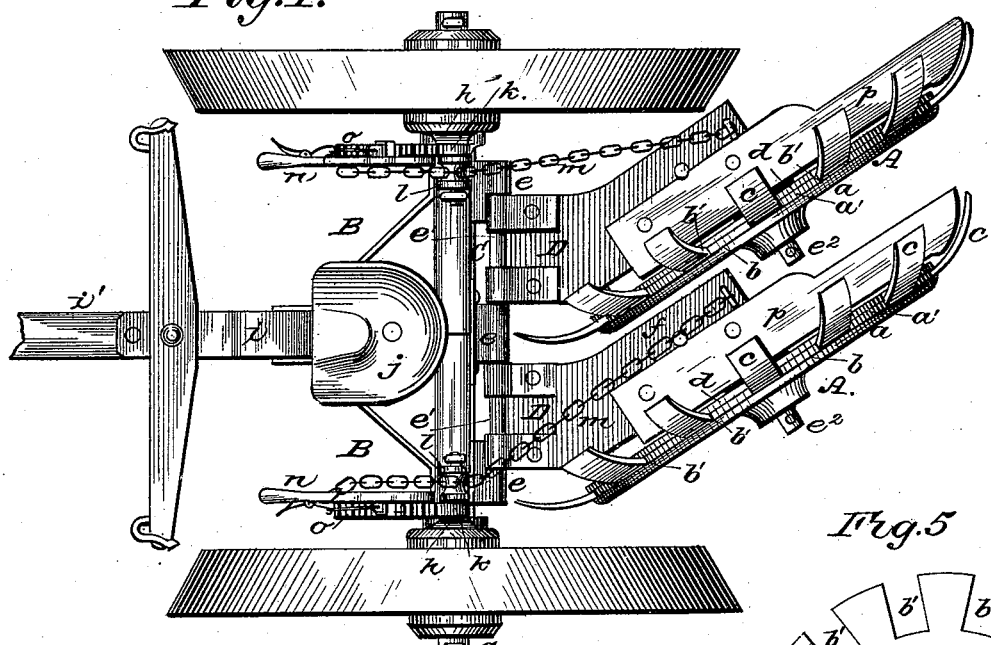
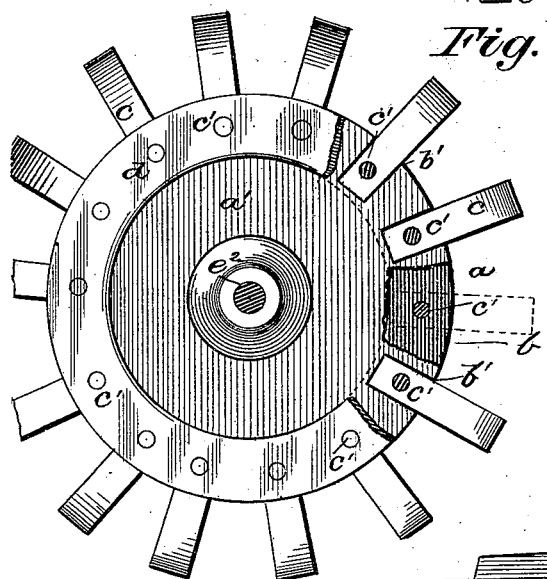
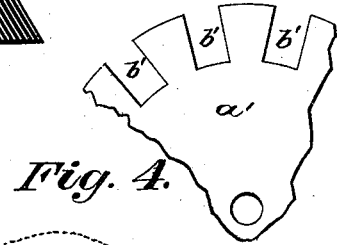
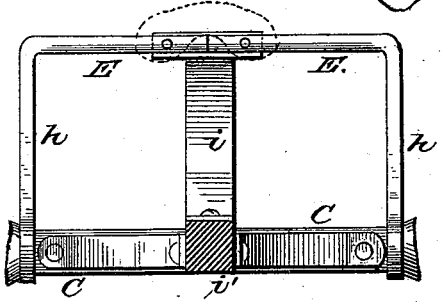
WITNESSES:
Fred G. Dieterich
A. G. Lyne
INVENTOR:
Hiram Skillings
BY Munn & Co.
ATTORNEYS.

UNITED STATES PATENT OFFICE.

HIRAM SKILLINGS, OF MINNEAPOLIS, MINNESOTA.

SPADE-WHEEL PLOW.

SPECIFICATION forming part of Letters Patent No. 307,809, dated November 11, 1884.

Application filed March 3, 1884. (No model.)

*To all whom it may concern:*

Be it known that I, HIRAM SKILLINGS, of Minneapolis, in the county of Hennepin and State of Minnesota, have invented a new and useful Improvement in Spade-Wheel Plows, of which the following is a full, clear, and exact description, reference being had to the annexed drawings, forming part of this specification.

This invention embodies certain improvements on the spade-wheel plow shown in my Patent No. 271,142, dated January 23, 1883; and it consists of the construction and arrangement of parts, hereinafter described and claimed.

In the drawings, Figure 1 is a top plan view of my improved spade-wheel plow. Fig. 2 is a side view of one of the spade-wheels partly broken away. Fig. 3 is a detail view of one of the spade-wheel supports partly in section; and Fig. 4 is a detail view of the seat-supporting frame and mechanism for elevating the spade-wheels. Fig. 5 is a detail view.

In my above-named patent I have shown a spade-wheel formed of two disks and a series of curved spades having T-shaped shanks, which are embedded in recesses in the faces of the disks, and clamped between the latter by means of bolts passing through the disks between the spades. A series of such wheels are arranged on separate axles obliquely to the line of draft, with the convex side of one wheel arranged opposite to the concave side of another, so that one will throw the soil it turns over into the furrow formed by another.

In my present invention I have modified the construction of the spade-wheel with a view to reduction of expense in manufacturing the same and convenience in putting in and removing the spades. To this end one of the disks, as $a$, is formed with a plane surface, $b$, on one side, and the other disk, $a'$, which is placed on the surface $b$, is formed with radial slots $b'$ in its periphery for receiving the shanks of the curved spades $c$. The shanks of the spades are made straight instead of T-shaped, so that they may be inserted into the slots $b'$ endwise. On the opposite side of the disk $a'$ from the disk $a$—that is, on the concave side of the wheel—is arranged a flat ring or annular plate, $d$, which covers the recesses or slots $b'$ and the shanks of the spades. These parts being arranged together as described are secured together by means of bolts $c'$, passing through the disk $a$, the shanks of the spades, and the annular plate. The advantage of this construction is that only one of the disks requires to be recessed to receive the spades, and any spade may be removed and replaced by simply taking out the bolt by which it is secured, and without loosening or removing any other part of the wheel. The disk $a$ is arranged on the convex instead of the concave side of the wheel, because the strain on the spades requires a stronger support at that side, the annular plate $d$ being sufficient to support them on the concave side of the wheel. The spade-wheels A being thus constructed are to be flexibly connected to a wheeled frame, B, instead of constituting a vehicle in themselves, as shown in my aforesaid patent.

The stationary axle C of the wheeled frame is provided with bearings $e$ at the rear for a removable rod, $e'$, on which the arms or supports D of the spade-wheels are hung or hinged. These bearings may be so arranged that a separate rod, $e'$, may be used for each spade-wheel or pair of spade-wheels, so that said spade-wheel or pair of spade-wheels may be removed without disturbing the other spade-wheels of the series. The rear ends of the arms D are provided with axles $e^2$, arranged obliquely to the line of draft, for supporting the spade-wheels. In order that the obliquity of the axles may be adjusted to any desired degree, the axles are connected to the arms D by means of a plate, $f$, forming a socket, $f'$, with the arm, which socket is made flaring at its farthest end from the wheel, and provided with two oppositely-arranged set-screws, $g$, passing through the said plate and adapted to bear against opposite sides of the axle-shank. With this construction, by a proper adjustment of the screws $g$ the shank of the axle in the larger end of the flaring socket will be moved forward or backward, causing a corresponding deflection of the outer end of the axle.

E indicates the seat-supporting frame formed of two rectangularly-bent standards, $h\,h$, which are provided with openings by which they are to be passed over the ends of the axle C. These standards are connected together at their upper ends above the center of the wheeled frame, and are supported by a brace, $i$, bolted to the standards, and to the tongue $i'$ of the frame B. The seat $j$ is supported on this brace.

To the standards $h$, at the sides of frame E, are secured vertical plates $k$ $k$, supporting sheaves $l$ $l$, over which pass chains $m$ $m$, connected to the rear ends of arms D at one of their ends, and to levers $n$ $n$ at their other end, which levers are pivoted to said plates, and are adapted to lift the arms D to elevate the spade-wheels, and the plates are provided with retaining-racks $o$ $o$ for holding the said levers in any desired position for supporting the spade-wheels above ground.

To the upper surface of each arm D is secured a scraper, $p$, which serves as a shield to prevent soil from dropping from the spades of the wheel upon the axle of said wheel. The scraper extends rearward and fits closely enough in the concavity of the spades to prevent soil from adhering in quantity between the spades.

What I claim is—

1. The spade-wheel consisting of the disk $a'$, having radial slots $b'$ in its periphery, the curved spades $c$, having straight shanks set in said slots, and being all curved to one and the same side, the annular plate $d$, covering said slots on the concave side of the wheel, the disk $a$, covering said slots on the convex side of the wheel to support the strain on the spades, and the bolts securing said parts together, substantially as shown and described.

2. The combination of the wheeled frame B, having bearings $e$, the removable rod $e'$, supported in said bearings, the independent oscillatory supports D, hung on said rod, the axles $e^2$, connected to said supports and arranged obliquely to the line of draft, the spade-wheels A, mounted on said axles, and the scrapers $p$, fitted in the concavities of the spade-wheels and extending over the said axles, substantially as shown and described.

HIRAM SKILLINGS.

Witnesses:
A. G. LYNE,
SOLON C. KEMON.